US012791437B2

(12) United States Patent
Gameros Madrigal et al.

(10) Patent No.: US 12,791,437 B2
(45) Date of Patent: Nov. 10, 2026

(54) SYSTEM AND METHOD FOR DETERMINING LOCATION OF OBJECT

(71) Applicant: ROLLS-ROYCE PLC, London (GB)

(72) Inventors: Andres A Gameros Madrigal, Nottingham (GB); Xin Dong, Nottingham (GB); Dragos A Axinte, Nottingham (GB); Tianyi Zeng, Nottingham (GB); Abdelkhalick Mohammad, Nottingham (GB); Jeremy G Hackett, Derby (GB)

(73) Assignee: ROLLS-ROYCE plc, London (GB)

( * ) Notice: Subject to any disclaimer, the term of this patent is extended or adjusted under 35 U.S.C. 154(b) by 382 days.

(21) Appl. No.: 18/510,948

(22) Filed: Nov. 16, 2023

(65) Prior Publication Data

US 2024/0192087 A1 Jun. 13, 2024

(30) Foreign Application Priority Data

Dec. 7, 2022 (GB) ..................................... 2218387

(51) Int. Cl.
*G01M 15/02* (2006.01)
*G01M 15/14* (2006.01)

(52) U.S. Cl.
CPC ............ *G01M 15/02* (2013.01); *G01M 15/14* (2013.01)

(58) Field of Classification Search
CPC ..................................................... G01M 15/02
See application file for complete search history.

(56) References Cited

U.S. PATENT DOCUMENTS

| | | | | |
|---|---|---|---|---|
| 4,146,967 | A | 4/1979 | Rohner et al. | |
| 8,199,197 | B2 | 6/2012 | Bennett et al. | |
| 9,234,904 | B2 | 1/2016 | Troy et al. | |
| 10,634,123 | B2 | 4/2020 | Georgeson et al. | |
| 2006/0043303 | A1 * | 3/2006 | Safai .................. | G01N 21/9515 250/347 |

(Continued)

FOREIGN PATENT DOCUMENTS

| | | | |
|---|---|---|---|
| AU | 2021107031 | A4 | 12/2021 |
| EP | 3182102 | A1 | 6/2017 |

(Continued)

OTHER PUBLICATIONS

Jun. 19, 2023 Search Report issued in British Patent Application No. 2218387.5.

(Continued)

*Primary Examiner* — Walter L Lindsay, Jr.
*Assistant Examiner* — Andrew V Do
(74) *Attorney, Agent, or Firm* — Oliff PLC

(57) ABSTRACT

A method for determining a location of an object relative to a component includes providing a frame. The method further includes coupling a plurality of encoders to the frame. The plurality of encoders is configured to generate a plurality of encoder signals. Each encoder signal from the plurality of encoder signals is representative of a location of the object relative to the respective encoder. The method further includes removably attaching the frame to the component. The method further includes receiving the plurality of encoder signals from the plurality of encoders. The method further includes determining a location of the object relative to the component based on the plurality of encoder signals.

26 Claims, 7 Drawing Sheets

(56) References Cited

U.S. PATENT DOCUMENTS

| | | | |
|---|---|---|---|
| 2008/0245151 A1 | 10/2008 | Roney et al. |
| 2019/0186470 A1 | 6/2019 | Georgeson et al. |
| 2020/0025039 A1 | 1/2020 | Danko et al. |
| 2021/0060721 A1 | 3/2021 | Gameros Madrigal et al. |
| 2022/0193919 A1 | 6/2022 | Ozcelik |

FOREIGN PATENT DOCUMENTS

| | | |
|---|---|---|
| EP | 3133998 B1 | 7/2019 |
| EP | 3530401 A1 | 8/2019 |
| GB | 2541689 A | 3/2017 |

OTHER PUBLICATIONS

Mar. 19, 2024 Extended European Search Report issued in European Patent Application No. 23208835.1.

Z. Jason Geng et al., "A "3-2-1" Kinematic Configuration of a Stewart Platform and Its Application to Six Degrees of Freedom Pose Measurements", Robotics & Computer-Integrated Manufacturing, vol. 11, No. 1, (1994), pp. 23-34.

Jun. 15, 2026 Office Action issued in European Patent Application No. 23208835.1.

* cited by examiner

SYSTEM AND METHOD FOR DETERMINING LOCATION OF OBJECT

This specification is based upon and claims the benefit of priority from UK Patent Application Number 2218387.5 filed on 7 Dec. 2022, the entire contents of which are incorporated herein by reference.

BACKGROUND

Field of the Disclosure

The present disclosure relates to a system and a method for determining a location of an object relative to a component.

Background of the Disclosure

Different components of a gas turbine engine may need to be inspected for defects. Defects can occur in the form of scratches, irregularities, or contamination. These defects can, in operation, be origin of cracks that may lead to component failure.

Inspection may be carried out by an inspection probe (e.g., a C-scan probe). The inspection probe may be moved on a surface of the component to scan the surface. It may be critical to accurately determine the position of the inspection probe in order to accurately determine the location of the defects in the component.

SUMMARY OF THE DISCLOSURE

According to a first aspect there is provided a method for determining a location of an object relative to a component. The method includes providing a frame. The method further includes coupling a plurality of encoders to the frame. The plurality of encoders is configured to generate a plurality of encoder signals. Each encoder signal from the plurality of encoder signals is representative of a location of the object relative to the respective encoder. The method further includes removably attaching the frame to the component. The method further includes receiving the plurality of encoder signals from the plurality of encoders. The method further includes determining a location of the object relative to the component based on the plurality of encoder signals.

The method of the present disclosure may be used to accurately and repeatably determine the location of the object relative to the component. A location of the object may be determined relative to the frame based on the plurality of encoder signals. A positional relationship between the frame and the component may be known. Therefore, when the frame is removably attached to the component, the location of the object can be further determined relative to the component based on the plurality of encoder signals.

In some examples, the method may be used with an inspection device to perform an inspection procedure on a subject component. The method may be easy to perform by a single person, thereby facilitating the inspection procedure. In some other examples, the method may be used for repairing and/or machining the subject component. The method may ensure that such operations are provided in correct locations regardless of the geometry of the subject component. Moreover, the method may allow inspection of subject components in-situ. In other words, the method may allow inspection of the subject components without the need to be removed from their overall system.

In some embodiments, determining the location of the object relative to the component further includes combining the plurality of encoder signals received from the plurality of encoders. The method may utilise a suitable algorithm or model (e.g., a kinematic model) to combine the plurality of encoder signals to determine the location of the object relative to the component.

In some embodiments, the method further includes determining coordinates of the object relative to the component based on the plurality of encoder signals. The coordinates of the object may be two-dimensional (2D) coordinates or three-dimensional (3D) coordinates.

In some embodiments, determining the coordinates of the object further includes determining three-dimensional coordinates of the object relative to the component based on the plurality of encoder signals. Determining the coordinates of the object further includes converting the three-dimensional coordinates to two-dimensional coordinates. The method may include only determining the 3D coordinates, and converting the determined 3D coordinates to 2D coordinates if required.

In some embodiments, the method further includes providing the coordinates of the object to an inspection device. The inspection device may utilise the coordinates as an input.

In some embodiments, providing the coordinates of the object to the inspection device further includes generating one or more pulse width modulated signals based on the coordinates of the object. Providing the coordinates of the object to the inspection device further includes providing the pulse width modulated signals to the inspection device. The pulse modulated signals may be compatible with the inspection device as an input.

In some embodiments, the object includes an inspection probe configured to generate one or more probe signals. The method further includes providing the one or more probe signals to the inspection device. The inspection probe may be, for example, a C-scan probe.

In some embodiments, the method further includes combining, via the inspection device, the coordinates of the object and the one or more probe signals to generate an inspection map. The inspection map may be analysed to determine defects in the subject component.

In some embodiments, the object includes a tool. The tool may be a repair tool, a machining tool, and the like.

In some embodiments, the plurality of encoders includes a plurality of string encoders. Each of the plurality of string encoders includes an encoder body and a cable extending from the encoder body. The method further includes coupling the object to the cable of each of the plurality of string encoders via a spherical joint. The spherical joint may improve the accuracy of determining the location of the object relative to the component.

In some embodiments, generating each of the plurality of encoder signals further includes determining an extension of the cable relative to the encoder body of the respective string encoder. Generating each of the plurality of encoder signals further includes generating the encoder signal based on the extension of the cable.

In some embodiments, the plurality of encoders includes a plurality of distance measuring sensors. The plurality of distance measuring sensors may include, for example, a plurality of cameras or a plurality of magnetic sensors. Some distance measuring sensors, such as cameras and magnetic sensors, may not require a physical connection with the object, and therefore may improve a movement capability of the object.

In some embodiments, removably attaching the frame to the component further includes removably coupling at least one of a clamp of the frame and a suction cup of the frame to the component. The clamp and the suction cup may securely mount the frame to the component.

In some embodiments, the component includes a fan blade. Removably attaching the frame to the component further includes removably attaching the frame to the fan blade. Advantageously, the method may allow inspection of an adjacent fan blade in-situ.

According to a second aspect there is provided a system for determining a location of an object relative to a component. The system includes a frame configured to be removably attached to the component. The system further includes a plurality of encoders coupled to the frame. The plurality of encoders is configured to generate a plurality encoder signals. Each encoder signal from the plurality of encoder signals is representative of a location of the object relative to the respective encoder. The system further includes a processor communicably coupled to the plurality of encoders. The processor is configured to receive the plurality of encoder signals from the plurality of encoders. The processor is further configured to determine a location of the object relative to the component based on the plurality of encoder signals.

The system of the present disclosure may be used to accurately and repeatably determine the location of the object relative to the component. The processor may determine a location of the object relative to the frame based on the plurality of encoder signals. A positional relationship between the frame and the component may be known. Therefore, when the frame is removably attached to the component, the location of the object can be further determined relative to the component based on the plurality of encoder signals.

The system may be used to perform the method of the first aspect. The system be portable, easy to install, and easy to operate. In some cases, the system may be conveniently operated by a single person. The system may be easy and economical to manufacture.

In some embodiments, the processor is further configured to combine the plurality of encoder signals to determine the location of the object relative to the component based on the plurality of encoder signals. The processor may utilise a suitable algorithm or model (e.g., a kinematic model) to combine the plurality of encoder signals to determine the location of the object relative to the component.

In some embodiments, the processor is further configured to determine coordinates of the object relative to the component based on the plurality of encoder signals. The coordinates of the object may be two-dimensional (2D) coordinates or three-dimensional (3D) coordinates.

In some embodiments, the processor is further configured to determine three-dimensional coordinates of the object relative to the component based on the plurality of encoder signals. The processor is further configured to convert the three-dimensional coordinates to two-dimensional coordinates. The processor may only determine the 3D coordinates, and convert the determined 3D coordinates to 2D coordinates if required.

In some embodiments, the system further includes an inspection device communicably coupled to the processor. The processor is further configured to provide the coordinates to the inspection device. The inspection device may utilise the coordinates as an input.

In some embodiments, the object includes an inspection probe communicably coupled to the inspection device and configured to generate one or more probe signals. The inspection device is configured to receive the one or more probe signals from the inspection probe. The inspection probe may be, for example, a C-scan probe.

In some embodiments, the inspection device is further configured to combine the coordinates of the object and the one or more probe signals to generate an inspection map. The inspection map may be analysed to determine defects in the subject component.

In some embodiments, the object includes a tool. The tool may be a repair tool, a machining tool, and the like.

In some embodiments, the frame includes a first portion. A first set of the plurality of encoders is coupled to the first portion. The frame further includes a second portion spaced apart from the first portion and connected to the first portion. A second set of the plurality of encoders is coupled to the second portion.

In some embodiments, the frame further includes at least one of a clamp and a suction cup.

The at least one of the clamp and the suction cup is removably coupled to the component to removably attach the frame to the component. The clamp and the suction cup may securely mount the frame to the component.

In some embodiments, the plurality of encoders includes a plurality of string encoders. Each of the plurality of string encoders includes an encoder body and a cable extending from the encoder body. The system further includes a spherical joint coupling the object to the cable of each of the plurality of string encoders. The spherical joint may improve the accuracy of determining the location of the object relative to the component.

In some embodiments, the plurality of encoders includes a plurality of distance measuring sensors. The plurality of distance measuring sensors may include, for example, a plurality of cameras or a plurality of magnetic sensors. Some distance measuring sensors, such as cameras and magnetic sensors, may not require a physical connection with the object, and therefore may improve a movement capability of the object.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed). The gearbox may be a reduction gearbox (in that the output to the fan is a lower rotational rate than the input from the core shaft). Any type of gearbox may be used.

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. The bypass duct may be substantially annular. The bypass duct may be radially outside the engine core. The radially outer surface of the bypass duct may be defined by a nacelle and/or a fan case.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e., the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre.

The fan of a gas turbine as described and/or claimed herein may have any desired number of fan blades, for example 14, 16, 18, 20, 22, 24 or 26 fan blades.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
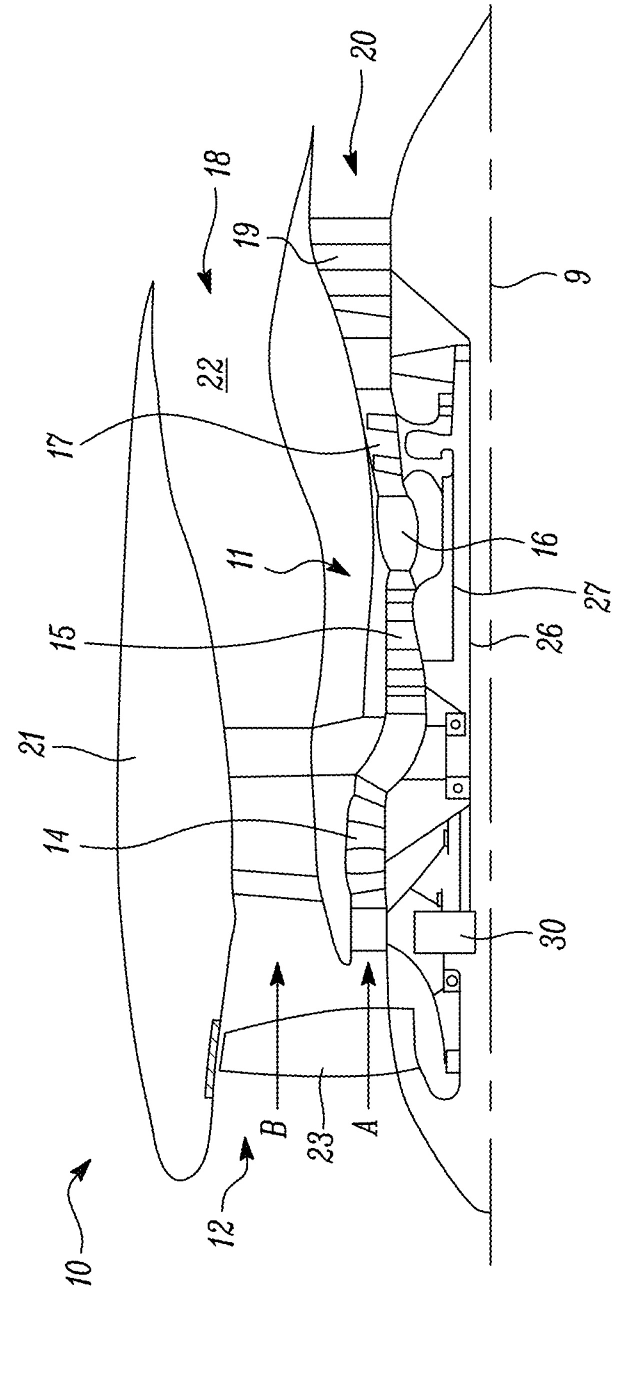
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Note that the terms "low pressure turbine" and "low pressure compressor" as used herein may be taken to mean the lowest pressure turbine stages and lowest pressure compressor stages (i.e., not including the fan 23) respectively and/or the turbine and compressor stages that are connected together by the interconnecting shaft 26 with the lowest rotational speed in the engine (i.e., not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 2:
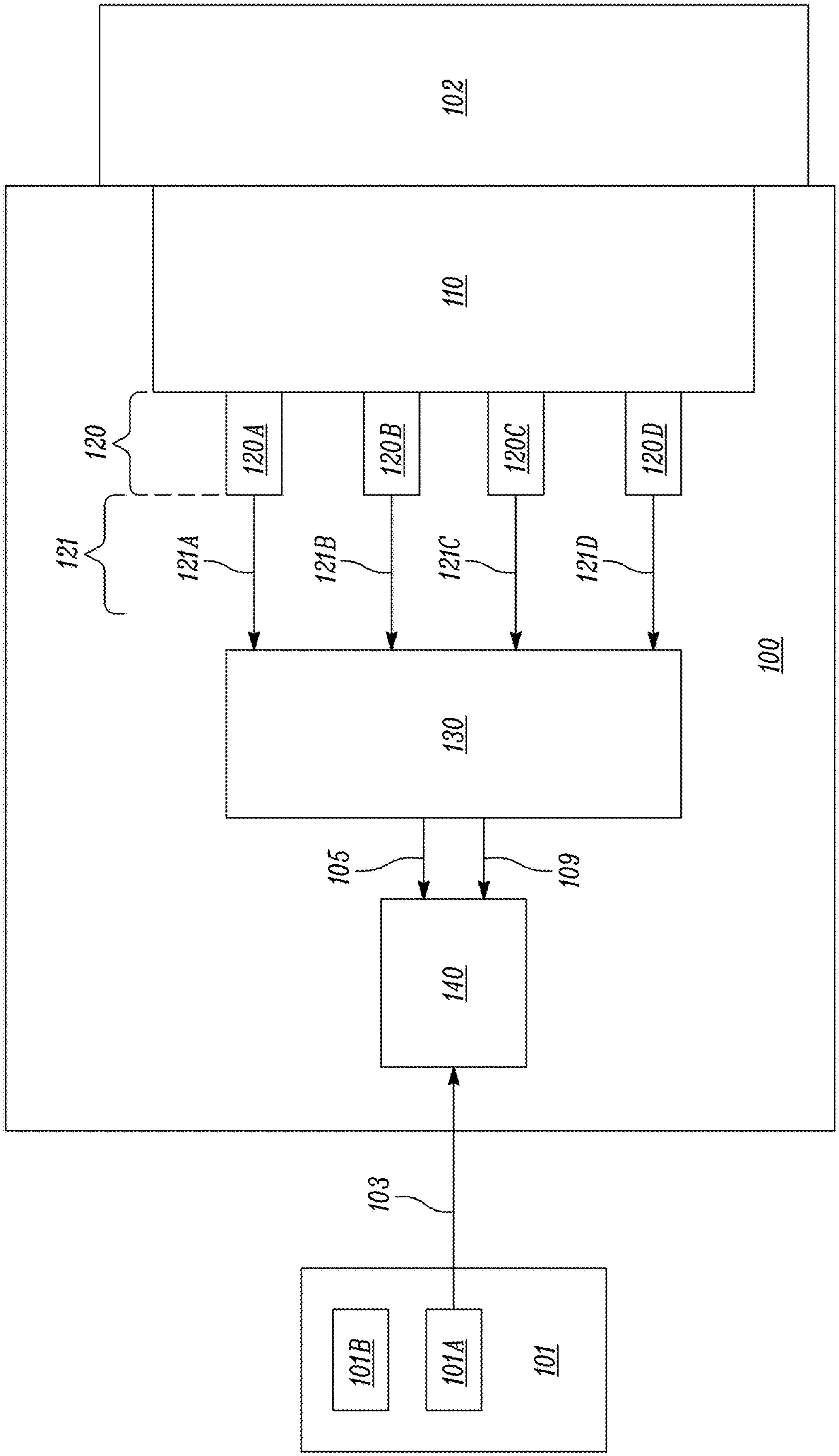
FIG. 2 is a schematic block diagram of a system in accordance with an embodiment of the present disclosure.

FIG. 2 shows a schematic block diagram of a system 100 for determining a location of an object 101 relative to a component 102 in accordance with an embodiment of the present disclosure.

The system 100 includes a frame 110. The frame 110 is configured to be removably attached to the component 102. The component 102 may be any structure, article, or object that is disposed proximal or adjacent to a subject component that is to be analysed (e.g., a fan blade or any other component). The component 102 may be stationary or capable of being brought into a stationary state. The frame 110 may include any suitable features that allow it to be removably attached to the component 102, such as clamps and other fastening devices.

The system 100 further includes a plurality of encoders 120. As used herein, the term "encoder" broadly refers to any device capable of sensing a position of the object 101 relative to itself. An encoder may generate electrical signals corresponding to the sensed position of the object 101. In some embodiments, the plurality of encoders 120 may include a plurality of distance measuring sensors.

Some encoders may need to be coupled to the object 101 in order to sense the position of the object 101. Examples of such encoders include linear potentiometers, cable extension transducers, and the like. In some embodiments, the plurality of encoders 120 may include a plurality of string encoders. Some encoders may be capable of sensing the position of the object 101 without being coupled to the object 101. Examples of such encoders include LIDAR devices, imaging devices, magnetic sensors, and the like. In some embodiments, the plurality of encoders 120 may include a plurality of cameras.

The plurality of encoders 120 is coupled to the frame 110. The frame 110 may include any suitable design and features for coupling the plurality of encoders 120 thereto. For example, the plurality of encoders 120 may be coupled to the frame 110 by any suitable technique, including, but not limited to, physical connections (e.g., screws, rivets, bolts, etc.), chemical connections (e.g., adhesives, etc.), and designed connections (e.g., press fit, snap fit, etc.).

In the illustrated embodiment of FIG. 2, the plurality of encoders 120 includes four encoders 120, namely, a first encoder 120A, a second encoder 120B, a third encoder 120C, and a fourth encoder 120D. It may be noted that the plurality of encoders 120 may include any number of encoders 120 as per desired application attributes.

The plurality of encoders 120 is configured to generate a plurality encoder signals 121. The encoders 120 may generate respective encoder signals 121. As shown in FIG. 2, the first encoder 120A may generate a first encoder signal 121A. The second encoder 120B may generate a second encoder signal 121B. The third encoder 120C may generate a third encoder signal 121C. The fourth encoder 120D may generate a fourth encoder signal 121D.

Each encoder signal 121 from the plurality of encoder signals 121 is representative of a location of the object 101 relative to the respective encoder 120. The first encoder signal 121A may be representative of a location of the object 101 relative to the first encoder 120A. The second encoder signal 121B may be representative of a location of the object 101 relative to the second encoder 120B. The third encoder signal 121C may be representative of a location of the object 101 relative to the third encoder 120C. The fourth encoder signal 121D may be representative of a location of the object 101 relative to the fourth encoder 120D.

The system 100 further includes a processor 130. The processor 130 may include one or more of a microprocessor, a controller, a digital signal processor (DSP), an application specific integrated circuit (ASIC), a field-programmable gate array (FPGA), a system on chip (SoC) or equivalent discrete or integrated logic circuitry. The processor 130 may include integrated circuitry, i.e., integrated processing circuitry, and the integrated processing circuitry may be realized as fixed hardware processing circuitry, programmable processing circuitry, and/or a combination of both fixed and programmable processing circuitry. In some embodiments, a small single-board computer (SBC), such as a Raspberry Pi, may include the processor 130.

The processor 130 is communicably coupled to the plurality of encoders 120. In the illustrated embodiment of FIG. 2, the processor 130 is communicably to each of the first, second, third, and fourth encoders 120A, 120B, 120C, 120D. The processor 130 may be communicably coupled to the plurality of encoders 120 via a wired or a wireless connection.

The processor 130 is configured to receive the plurality of encoder signals 121 from the plurality of encoders 120. The processor 130 may be configured to receive the first encoder signal 121A from the first encoder 120A, the second encoder signal 121B from the second encoder 120B, the third encoder signal 121C from the third encoder 120C, and the fourth encoder signal 121D from the fourth encoder 120D.

The processor 130 is further configured to determine a location of the object 101 relative to the component 102 based on the plurality of encoder signals 121.

The processor 130 may determine a location of the object 101 relative to the frame 110 based on the plurality of encoder signals 121. A positional relationship between the frame 110 and the component 102 may be known. Therefore, when the frame 110 is removably attached to the component 102, the location of the object 101 can be further determined relative to the component 102 based on the plurality of encoder signals 121.

The processor 130 may process the plurality of encoder signals 121 to determine the location of the object 101 relative to the component 102. Positions of the plurality of encoders 120 relative to each other on the frame 110 may be predetermined. The processor 130 may be configured to process the plurality of encoder signals 121 based on the predetermined relative positions of the plurality of encoders 120 to determine the location of the object 101 relative to the component 102.

The processor 130 may be further configured to combine the plurality of encoder signals 121 to determine the location of the object 101 relative to the component 102 based on the plurality of encoder signals 121. The processor 130 may utilise various algorithms and models to combine the plurality of encoder signals 121 to determine the location of the object 101 relative to the component 102 based on the plurality of encoder signals 121. In some embodiments, the processor 130 may utilise a kinematic model (specifically, a forward kinematic model) to combine the plurality of encoder signals 121. The kinematic model may be programmed in any suitable computer language, such as, for example, C, C++, and Python.

The system 100 may be used to accurately determine the location of the object 101 relative to the component 102. The system 100 may be portable, easy to install, and easy to operate. In some cases, the system 100 may be conveniently operated by a single person. The system 100 may be easy and economical to manufacture.

In some examples, the location of the object 101 relative to the component 102 may be used as an input for a device. For example, the location of the object 101 relative to the component 102 may be provided as an input to an inspection device for inspecting the subject component disposed adjacent to the component 102. In another example, the object 101 may be a repair tool, and the system 100 may be used to ensure that a repair is done in a correct region or area of the subject component, regardless of a geometry of the subject component being repaired.

Figure 3B:
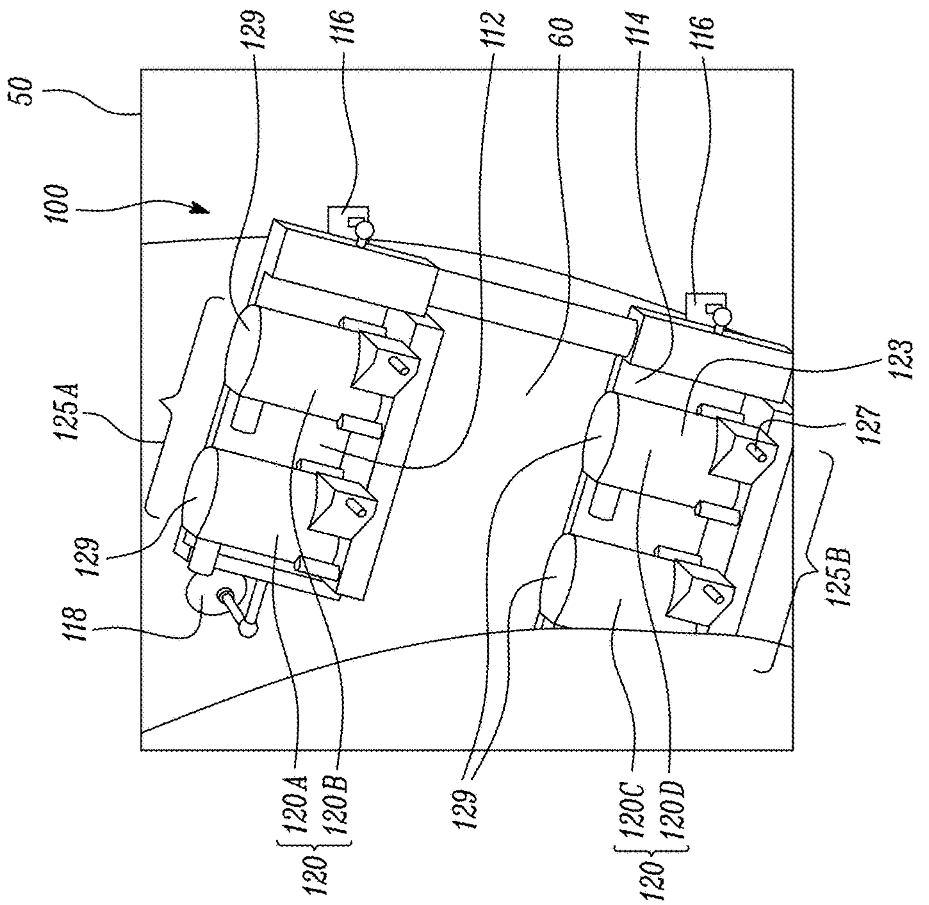
FIG. 3B is a schematic zoomed-in view of a portion of FIG. 3A in accordance with an embodiment of the present disclosure.
Figure 3A:
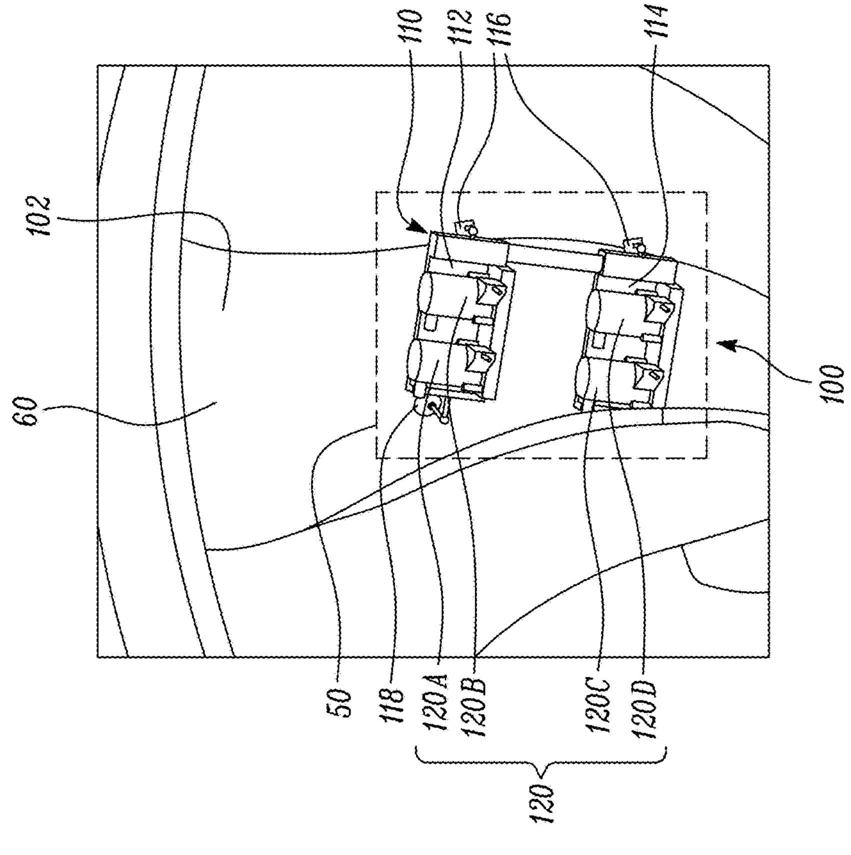
FIG. 3A is a schematic perspective view of the system in accordance with an embodiment of the present disclosure.

FIG. 3A shows a schematic perspective view of the system 100 in accordance with an embodiment of the present disclosure. In FIG. 3A, the frame 110 is attached to the component 102. FIG. 3B shows a schematic zoomed-in view of a portion 50 of FIG. 3A.

Referring to FIGS. 3A and 3B, in some embodiments, the component 102 may be a fan blade 60. The fan blade 60 may be a blade of the fan 23 of the gas turbine engine 10 (shown in FIG. 1).

In some embodiments, the frame 110 may include at least one of a clamp 116 and a suction cup 118. The at least one of the clamp 116 and the suction cup 118 may be removably coupled to the component 102 to removably attach the frame 110 to the component 102.

In some embodiments, the frame 110 may further include a first portion 112 and a second portion 114 spaced apart from the first portion 112. The second portion 114 may be connected to the first portion 112. For example, the second portion 114 may be connected to the first portion 112 by a pinned connection.

In the illustrated embodiment of FIGS. 3A and 3B, the frame 110 includes two clamps 116 and one suction cup 118. One of the two clamps 116 is disposed adjacent to the first portion 112 and the other of the two clamps 116 is disposed adjacent to the second portion 114. Further, the suction cup 118 is disposed adjacent to the first portion 112. The two clamps 116 and the one suction cup 118 may together securely mount the frame 110 to the component 102.

In some embodiments, a first set 125A of the plurality of encoders 120 may be coupled to the first portion 112. For example, as shown in FIGS. 3A and 3B, the first set 125A may include the first encoder 120A and the second encoder 120B. The first encoder 120A and the second encoder 120B may be coupled to the first portion 112 of the frame 110.

In some embodiments, a second set 125B of the plurality of encoders 120 may be coupled to the second portion 114. For example, as shown in FIGS. 3A and 3B, the second set 125B may include the third encoder 120C and the fourth encoder 120D. The third encoder 120C and the fourth encoder 120D may be coupled to the second portion 114 of the frame 110.

In some embodiments, the plurality of encoders 120 may include a plurality of string encoders 129. Each of the plurality of string encoders 129 may include an encoder body 123 and a cable 127 extending from the encoder body 123. In FIG. 3B, the cable 127 of each of the plurality of string encoders 129 is uncoupled and is in a retracted state.

A string encoder is a device used to detect and measure linear position and velocity using the cable 127 and a spring-loaded spool that is disposed within the encoder body 123. A string encoder may also be referred to as a string pot, a draw wire sensor, a string encoder, or a yo-yo sensor.

As discussed above, alternatively, in some embodiments, the plurality of encoders 120 may include the plurality of distance measuring sensors. The plurality of distance measuring sensors may include, for example, a plurality of cameras or a plurality of magnetic sensors.

Some distance measuring sensors, such as cameras and magnetic sensors, may not require a physical connection with the object 101 (shown in FIG. 2), and therefore may improve a movement capability of the object 101.

Figure 4:
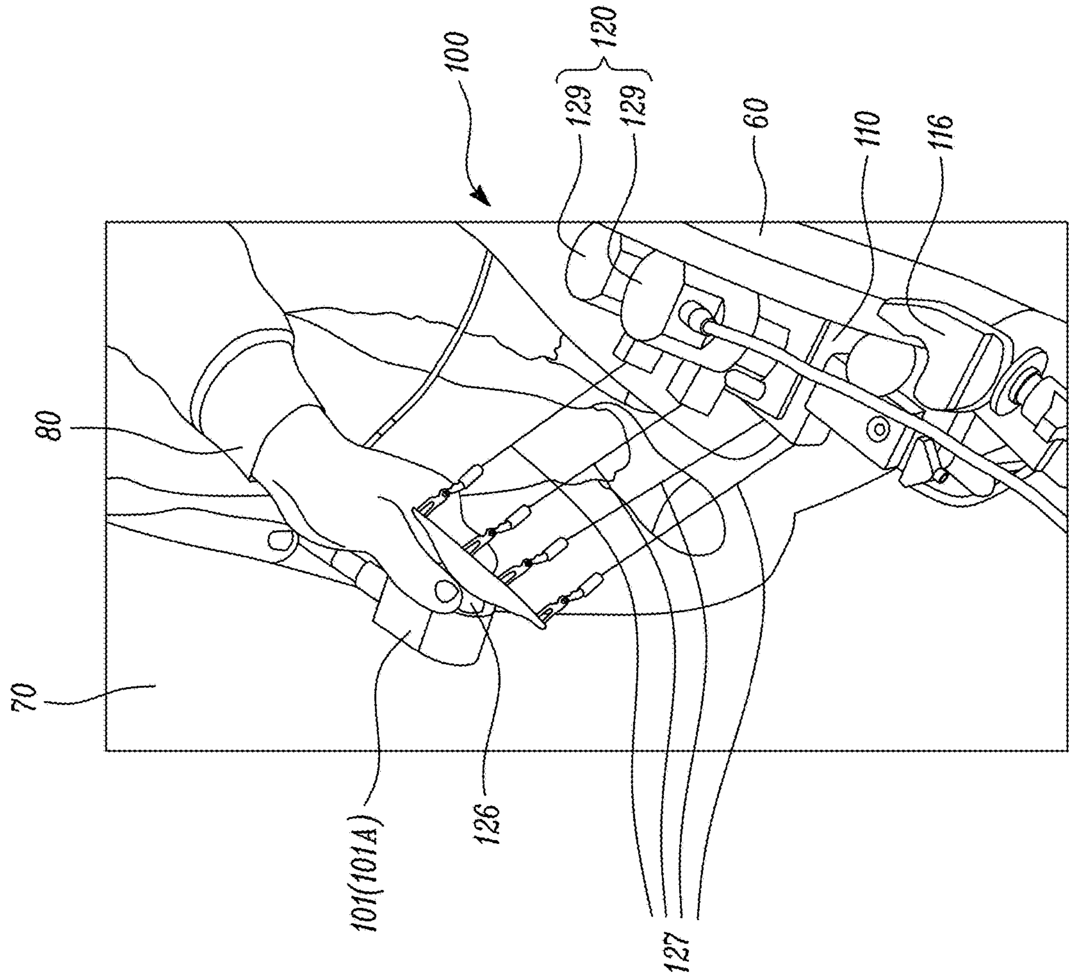
FIG. 4 is a schematic side perspective view of the system in accordance with an embodiment of the present disclosure.

FIG. 4 shows a schematic side perspective view of the system 100 in accordance with an embodiment of the present disclosure. In FIG. 4, the frame 110 is attached to the component 102, and the cable 127 of each of the plurality of string encoders 129 is coupled to the object 101.

The cable 127 of each of the plurality of string encoders 129 may be directly or indirectly coupled to the object 101. In the illustrated embodiment of FIG. 4, the system 100 further includes a spherical joint 126 coupling the object 101 to the cable 127 of each of the plurality of string encoders 129. The spherical joint 126 may include a first portion including a receptacle, and a second portion including a sphere (or a "ball") received within the receptacle. The sphere may rotate freely within the receptacle in two planes. The spherical joint 126 may therefore allow free rotation in the two planes at the same time while preventing translation in any direction. The object 101 may be coupled to the first portion, and the cable 127 of each of the plurality of string encoders 129 may be coupled to the second portion of the spherical joint 126. The spherical joint 126 may be made from any suitable material, such as metals, and preferably plastics. The spherical joint 126 may improve an accuracy of the system 100 in determining the location of the object 101 relative to the component 102.

Referring to FIGS. 2 to 4, the processor 130 may be further configured to determine coordinates 105 of the object 101 relative to the component 102 based on the plurality of encoder signals 121. The processor 130 may determine two-dimensional (2D) coordinates and/or three-dimensional (3D) coordinates of the object 101. In other words, the coordinates 105 may be 2D coordinates and/or 3D coordinates. In some embodiments, the processor 130 may be further configured to determine the 3D coordinates of the object 101 relative to the component 102 based on the plurality of encoder signals 121 and convert the 3D coordinates to the 2D coordinates.

The system 100 further may include an inspection device 140 communicably coupled to the processor 130. The processor 130 may be further configured to provide the coordinates 105 to the inspection device 140. Advantageously, the processor 130 may provide the coordinates 105 in a format (2D or 3D) that is compatible with the inspection device 140.

In some embodiments, the processor 130 may be further configured to generate one or more pulse width modulated (PWM) signals 109 based on the coordinates 105. The one or more PWM signals 109 may be compatible with the inspection device 140.

In some embodiments, the object 101 may include an inspection probe 101A communicably coupled to the inspection device 140. The inspection probe 101A may be configured to generate one or more probe signals 103. The inspection device 140 may be configured to receive the one or more probe signals 103 from the inspection probe 101A.

The inspection probe 101A may be manually moved on a surface of a subject component 70 by an operator 80. The subject component 70 shown in FIG. 4 is a fan blade adjacent to the fan blade 60.

Figure 5:
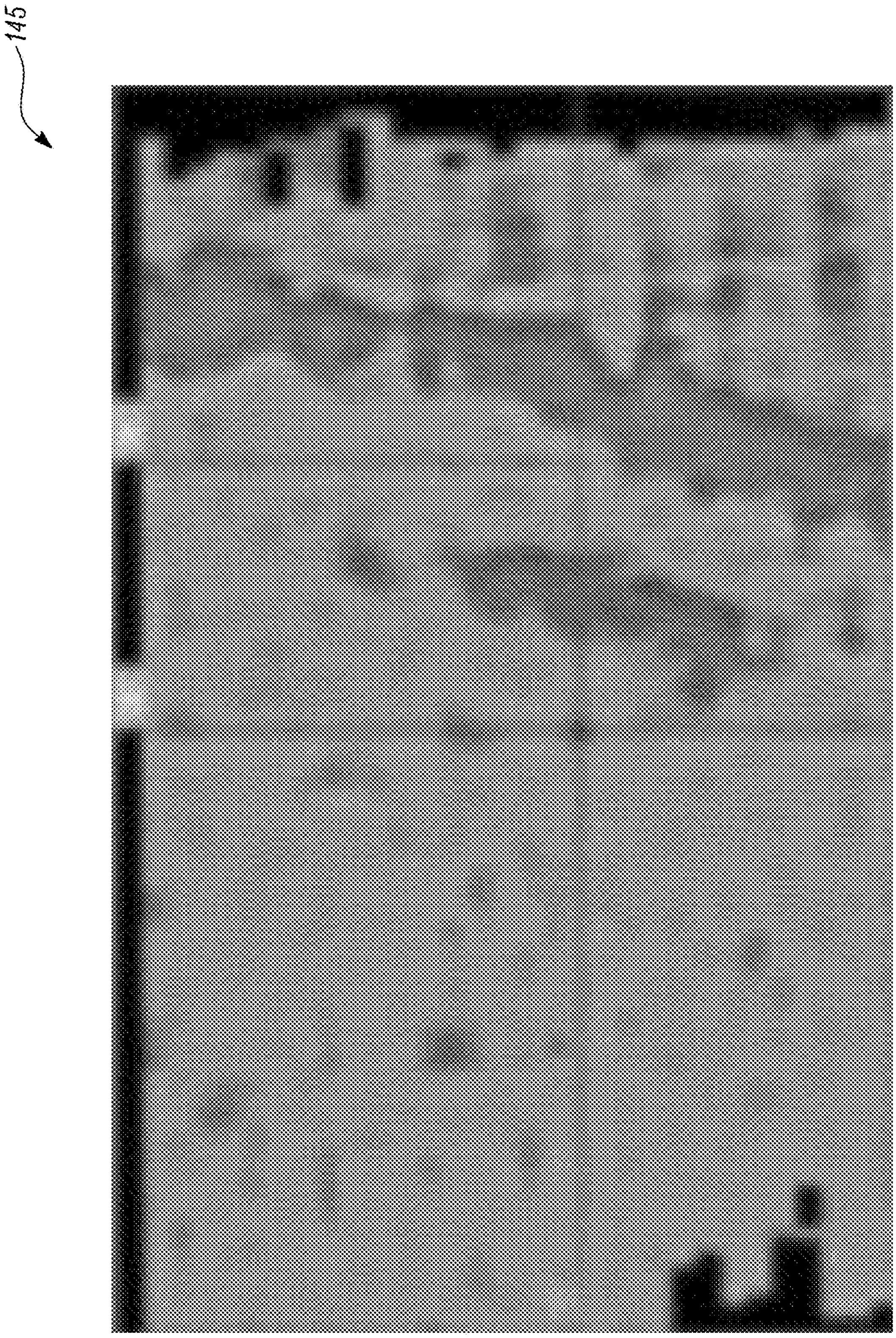
FIG. 5 is a photograph of an inspection map in accordance with an embodiment of the present disclosure.

In some embodiments, the inspection device 140 may be further configured to combine the coordinates 105 of the object 101 and the one or more probe signals 103 to generate an inspection map 145. The inspection map 145 is shown in FIG. 5. The inspection map 145 may be analysed to determine defects in the subject component 70.

Advantageously, the system 100 may allow determining location of defects or flaws in the subject component in-situ. For example, the fan blade 60 may be inspected in-situ without needing removal from a fan hub.

In some other embodiments, the object 101 may include a tool 101B. The tool 101B may include repair and machining tools (e.g., a drilling tool). In such embodiments, the system 100 may ensure that operations are engaged in correct place regardless of the geometry of the subject component 70.

Figure 6:
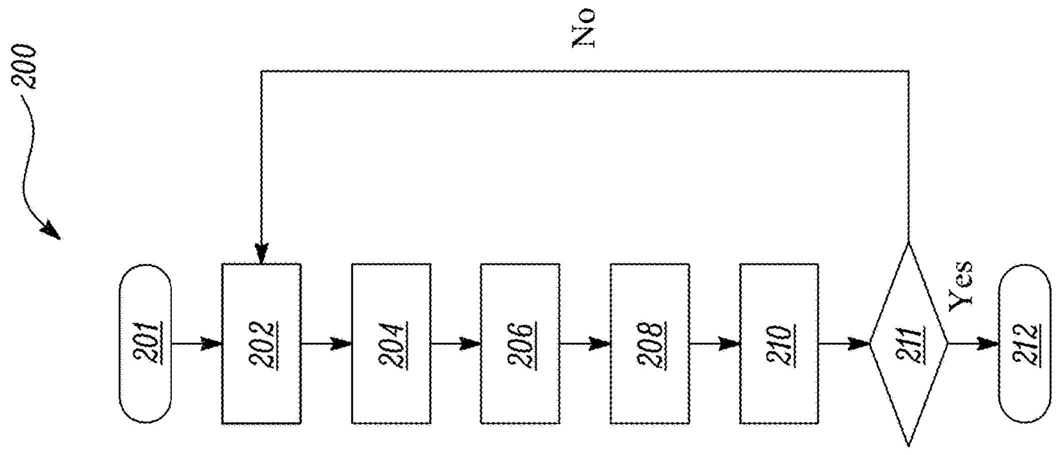
FIG. 6 is a flowchart depicting various steps of a process in accordance with an embodiment of the present disclosure.

FIG. 6 shows a flowchart depicting various steps of a process 200 in accordance with an embodiment of the present disclosure. The process 200 will be discussed with further reference to FIGS. 2 and 4.

At block 201, the process 200 initiates.

At block 202, the process 200 may include receiving the plurality of encoder signals 121 from the plurality of string encoders 129. For example, the processor 130 may receive the plurality of encoder signals 121 from the plurality of string encoders 129.

At block 204, the process 200 may further include determining a length of the cable 127 of each of the plurality of string encoders 129. The length of the cable 127 of each of the plurality of string encoders 129 may be determined based on each of the corresponding plurality of encoder signals 121. The processor 130 may determine the length of the cable 127 of each of the plurality of string encoders 129.

At block 206, the process 200 may further include calculating the coordinates 105 of the object 101 based on the plurality of encoder signals 121 received from the plurality of string encoders 129. For example, the processor 130 may calculate the coordinates 105 of the object 101 based on the plurality of encoder signals 121. The coordinates 105 may be 2D coordinates or 3D coordinates.

At block 208, the process 200 may further include generating the one or more PWM signals 109 based on the coordinates 105. The one or more PWM signals 109 may be compatible with various inspection devices, such as Omniscan MX from Olympus.

At block 210, the process 200 may further include providing the one or more PWM signals 109 to the inspection device 140.

At block 211, the process 200 may determine if a stop signal is provided. If no, the process 200 moves to block 202. If yes, the process 200 terminates at block 212.

Figure 7:
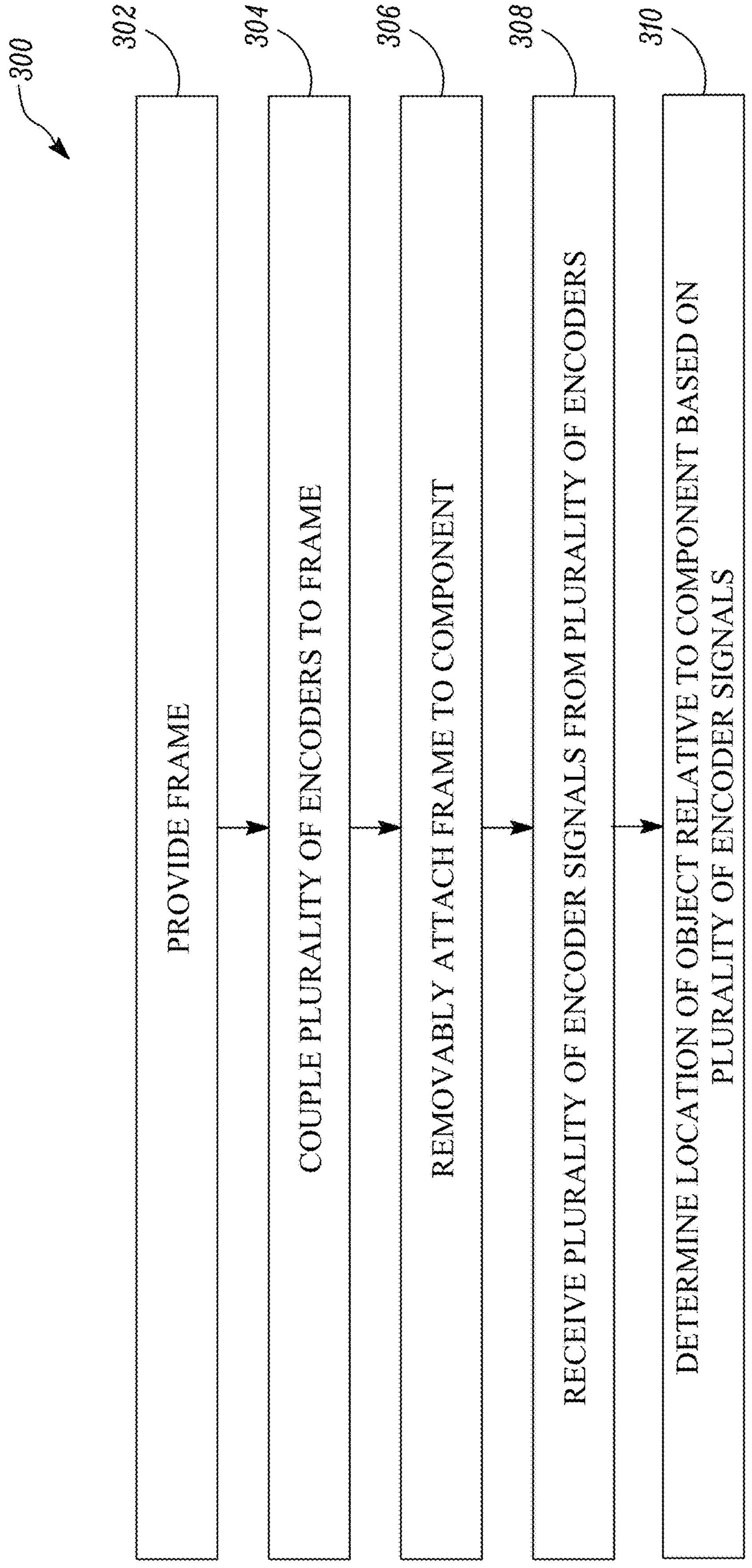
FIG. 7 is a flowchart depicting various steps of a method in accordance with an embodiment of the present disclosure.

FIG. 7 shows a flowchart depicting various steps of a method 300 for determining a location of an object relative to a component. For example, the method 300 may be used to determine the location of the object 101 (shown in FIG. 2) relative to the component 102. In some embodiments, at least some of the steps of the method 300 may be performed by the processor 130 of the system 100 (shown in FIG. 2). The method 300 will be discussed with further reference to FIGS. 2-4.

At step 302, the method 300 includes providing a frame. For example, the method 300 may include providing the frame 110.

At step 304, the method 300 further includes coupling a plurality of encoders to the frame. The plurality of encoders is configured to generate a plurality of encoder signals. Each encoder signal from the plurality of encoder signals is representative of a location of the object relative to the respective encoder. For example, the method 300 may include coupling the plurality of encoders 120 to the frame 110.

At step 306, the method 300 further includes removably attaching the frame to the component. For example, the method 300 may include removably attaching the frame 110 to the component 102.

At step 308, the method 300 further includes receiving the plurality of encoder signals from the plurality of encoders. For example, the method 300 may include receiving the plurality of encoder signals 121 from the plurality of encoders 120. The plurality of encoder signals 121 may be received by the processor 130.

At step 310, the method 300 further includes determining a location of the object relative to the component based on the plurality of encoder signals. For example, the method 300 may include determining the location of the object 101 relative to the component 102 based on the plurality of encoder signals 121. The location of the object 101 relative to the component 102 may be determined by the processor 130.

In some embodiments, determining the location of the object relative to the component further includes combining the plurality of encoder signals received from the plurality of encoders. For example, determining the location of the object 101 relative to the component 102 may include combining the plurality of encoder signals 121 received from the plurality of encoders 120. In some embodiments, the combining of the plurality of encoder signals 121 may be performed by the processor 130.

In some embodiments, the method 300 further includes determining coordinates of the object relative to the component based on the plurality of encoder signals. For example, the method 300 may further include determining the coordinates 105 of the object 101 relative to the component 102 based on the plurality of encoder signals 121. The coordinates 105 may be 3D coordinates or 2D coordinates.

In some embodiments, determining the coordinates of the object further includes determining three-dimensional coordinates of the object relative to the component based on the plurality of encoder signals. Determining the coordinates of the object further includes converting the three-dimensional coordinates to two-dimensional coordinates. For example, the method 300 may include determining the 3D coordinates of the object 101 relative to the component 102 based on the plurality of encoder signals 121 and converting the 3D coordinates to the 2D coordinates.

In some embodiments, the method 300 further includes providing the coordinates of the object to an inspection device. For example, the method 300 may include providing the coordinates 105 to the inspection device 140.

In some embodiments, providing the coordinates of the object to the inspection device further includes generating one or more pulse width modulated signals based on the coordinates of the object. Providing the coordinates of the object to the inspection device further includes providing the pulse width modulated signals to the inspection device. For example, the method 300 may include generating the one or more PWM signals 109 based on the coordinates 105 of the object 101 and providing the PWM signals 109 to the inspection device 140.

In some embodiments, the object includes an inspection probe configured to generate one or more probe signals. The method 300 further includes providing the one or more probe signals to the inspection device. For example, the object 101 may include the inspection probe 101A, and the method 300 may include providing the one or more probe signals 103 to the inspection device 140.

In some embodiments, the method 300 further includes combining, via the inspection device, the coordinates of the object and the one or more probe signals to generate an inspection map. For example, the method 300 may include combining, via the inspection device 140, the coordinates 105 of the object 101 and the one or more probe signals 103 to generate the inspection map 145.

In some embodiments, the object includes a tool. For example, the object 101 may include the tool 101B. The tool 101B may be a machining tool, a repair tool, and the like.

In some embodiments, the plurality of encoders includes a plurality of string encoders. Each of the plurality of string encoders includes an encoder body and a cable extending from the encoder body. The method 300 further includes coupling the object to the cable of each of the plurality of string encoders via a spherical joint. For example, the method 300 may include coupling the object 101 to the cable 127 of each of the plurality of string encoders 129 via the spherical joint 126.

In some embodiments, generating each of the plurality of encoder signals further includes determining an extension of the cable relative to the encoder body of the respective string encoder. Generating each of the plurality of encoder signals further includes generating the encoder signal based on the extension of the cable. For example, the method 300 may include determining the extension of the cable 127 relative to the encoder body 123 of the respective string encoder 129 and generating the encoder signal 121 based on the extension of the cable 127.

In some embodiments, the plurality of encoders includes a plurality of distance measuring sensors. For example, the plurality of encoders 120 may include a plurality of cameras or a plurality of magnetic sensors. Some distance measuring sensors, such as cameras and magnetic sensors, may not require a physical connection with the object 101, and therefore may improve a movement capability of the object 101.

In some embodiments, removably attaching the frame to the component further includes removably coupling at least one of a clamp of the frame and a suction cup of the frame to the component. For example, the method 300 may include removably coupling the at least one of the clamp 116 of the frame 110 and the suction cup 118 of the frame 110 to the component 102.

In some embodiments, the component includes a fan blade. Removably attaching the frame to the component further includes removably attaching the frame to the fan blade. For example, the method 300 may include removably attaching the frame 110 to the fan blade 60.

The system 100 and the method 300 may be used to accurately and repeatably identify location of defects in the subject component 70 in-situ. The system 100 may be portable, easy to install, and easy to operate by a single person (e.g., the operator 80). The system 100 and the method 300 may therefore facilitate inspection of the subject component 70 (shown in FIG. 4).

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

What is claimed is:

1. A method for determining a location of an object relative to a component, the method comprising:

providing a frame;

coupling a plurality of encoders to the frame, wherein the plurality of encoders is configured to generate a plurality of encoder signals, wherein each encoder signal from the plurality of encoder signals is representative of a location of the object relative to the respective encoder;

removably attaching the frame to the component;

receiving the plurality of encoder signals from the plurality of encoders;

determining a location of the object relative to the component based on the plurality of encoder signals; and generating one or more pulse width modulated signals based on coordinates of the object.

2. The method of claim 1, wherein determining the location of the object relative to the component further comprises combining the plurality of encoder signals received from the plurality of encoders.

3. The method of claim 1, further comprising determining the coordinates of the object relative to the component based on the plurality of encoder signals.

4. The method of claim 3, wherein determining the coordinates of the object further comprises:

determining three-dimensional coordinates of the object relative to the component based on the plurality of encoder signals; and converting the three-dimensional coordinates to two-dimensional coordinates.

5. The method of claim 3, further comprising providing the coordinates of the object to an inspection device.

6. The method of claim 5, wherein providing the coordinates of the object to the inspection device further comprises:

providing the pulse width modulated signals to the inspection device.

7. The method of claim 5, wherein the object comprises an inspection probe configured to generate one or more probe signals, and wherein the method further comprises providing the one or more probe signals to the inspection device.

8. The method of claim 7, further comprising combining, via the inspection device, the coordinates of the object and the one or more probe signals to generate an inspection map.

9. The method of claim 1, wherein the object comprises a tool.

10. The method of claim 1, wherein the plurality of encoders comprises a plurality of string encoders, each of the plurality of string encoders comprising an encoder body and a cable extending from the encoder body, and wherein the method further comprises coupling the object to the cable of each of the plurality of string encoders via a spherical joint.

11. The method of claim 10, wherein generating each of the plurality of encoder signals further comprises:

determining an extension of the cable relative to the encoder body of the respective string encoder; and generating the encoder signal based on the extension of the cable.

12. The method of claim 1, wherein the plurality of encoders comprises a plurality of distance measuring sensors.

13. The method of claim 1, wherein removably attaching the frame to the component further comprises removably coupling at least one of a clamp of the frame and a suction cup of the frame to the component.

14. The method of claim 1, wherein the component comprises a fan blade, and wherein removably attaching the frame to the component further comprises removably attaching the frame to the fan blade.

15. A system for determining a location of an object relative to a component, the system comprising:

a frame configured to be removably attached to the component;

a plurality of encoders coupled to the frame, wherein the plurality of encoders is configured to generate a plurality of encoder signals, wherein each encoder signal from the plurality of encoder signals is representative of a location of the object relative to the respective encoder; and a processor communicably coupled to the plurality of encoders;

wherein the processor is configured to:

receive the plurality of encoder signals from the plurality of encoders;

determine a location of the object relative to the component based on the plurality of encoder signals; and generate one or more pulse width modulated signals based on coordinates of the object.

16. The system of claim 15, wherein the processor is further configured to combine the plurality of encoder signals to determine the location of the object relative to the component based on the plurality of encoder signals.

17. The system of claim 15, wherein the processor is further configured to determine the coordinates of the object relative to the component based on the plurality of encoder signals.

18. The system of claim 17, wherein the processor is further configured to:

determine three-dimensional coordinates of the object relative to the component based on the plurality of encoder signals; and convert the three-dimensional coordinates to two-dimensional coordinates.

19. The system of claim 17, further comprising an inspection device communicably coupled to the processor, and wherein the processor is further configured to provide the coordinates to the inspection device.

20. The system of claim 19, wherein the object comprises an inspection probe communicably coupled to the inspection device and configured to generate one or more probe signals, and wherein the inspection device is configured to receive the one or more probe signals from the inspection probe.

21. The system of claim 20, wherein the inspection device is further configured to combine the coordinates of the object and the one or more probe signals to generate an inspection map.

22. The system of claim 15, wherein the object comprises a tool.

23. The system of claim 15, wherein the frame comprises:

a first portion, wherein a first set of the plurality of encoders is coupled to the first portion; and a second portion spaced apart from the first portion and connected to the first portion, wherein a second set of the plurality of encoders is coupled to the second portion.

24. The system of claim 15, wherein the frame further comprises at least one of a clamp and a suction cup, and wherein the at least one of the clamp and the suction cup is removably coupled to the component to removably attach the frame to the component.

25. The system of claim 15, wherein the plurality of encoders comprises a plurality of string encoders, each of the plurality of string encoders comprising an encoder body and a cable extending from the encoder body, and wherein the system further comprises a spherical joint coupling the object to the cable of each of the plurality of string encoders.

26. The system of claim 15, wherein the plurality of encoders comprises a plurality of distance measuring sensors.

* * * * *